United States Patent [19]
Lopez et al.

[11] Patent Number: 5,684,794
[45] Date of Patent: Nov. 4, 1997

[54] VALIDATION OF SUBSCRIBER SIGNALS IN A CELLULAR RADIO NETWORK

[75] Inventors: Alfred R. Lopez, Commack; John C. Papson, Melville; Leonard J. Rosenblum, East Meadow, all of N.Y.

[73] Assignee: Hazeltine Corporation, Greenlawn, N.Y.

[21] Appl. No.: 591,028

[22] Filed: Jan. 25, 1996

[51] Int. Cl.⁶ .................... H04B 1/10; H04Q 7/30
[52] U.S. Cl. .................... 370/337; 370/350; 375/349; 379/59; 455/33.1; 455/54.1; 455/63
[58] Field of Search .................... 370/328, 337, 370/350, 503, 508; 455/33.1, 33.4, 54.1, 56.1, 63, 65, 132–135; 375/346, 349, 365, 368; 379/59

[56] References Cited

U.S. PATENT DOCUMENTS

| | | | |
|---|---|---|---|
| 5,177,740 | 1/1993 | Toy et al. | 370/337 |
| 5,319,796 | 6/1994 | Grube et al. | 455/33.4 |
| 5,512,908 | 4/1996 | Herrick | 379/59 |
| 5,576,717 | 11/1996 | Searle et al. | 455/54.1 |
| 5,594,720 | 1/1997 | Papadopoulos et al. | 370/337 |

OTHER PUBLICATIONS

D.M. Balston, et al., Cellular Radio Systems, Ch. 9, pp. 225–235 (Artech House 1993).

R.C.V. Macario, Cellular Radio Principles and Design, pp. 186–189 (McGraw–Hill 1993).

EIA/TIA–IS–54–B, p. 11.

*Primary Examiner*—Hassan Kizou
*Attorney, Agent, or Firm*—Edward A. Onders; Leo Zucker

[57] ABSTRACT

A relative time offset is measured between transmission of a downlink signal from a cellular radio network base station, and a reference signal (e.g., sync word) included in an uplink signal received at the base station from a network subscriber. If the measured time offset is within a determined range, the uplink signal is judged to originate from a subscriber which is validly assigned to the base station, and the base station will continue to track the valid uplink signal. If the relative time offset is outside the determined range, the uplink signal is judged invalid, e.g., to originate from an interfering co-channel subscriber assigned to a remote base station. The receiving base station will then inhibit tracking of the invalid uplink signal.

17 Claims, 6 Drawing Sheets

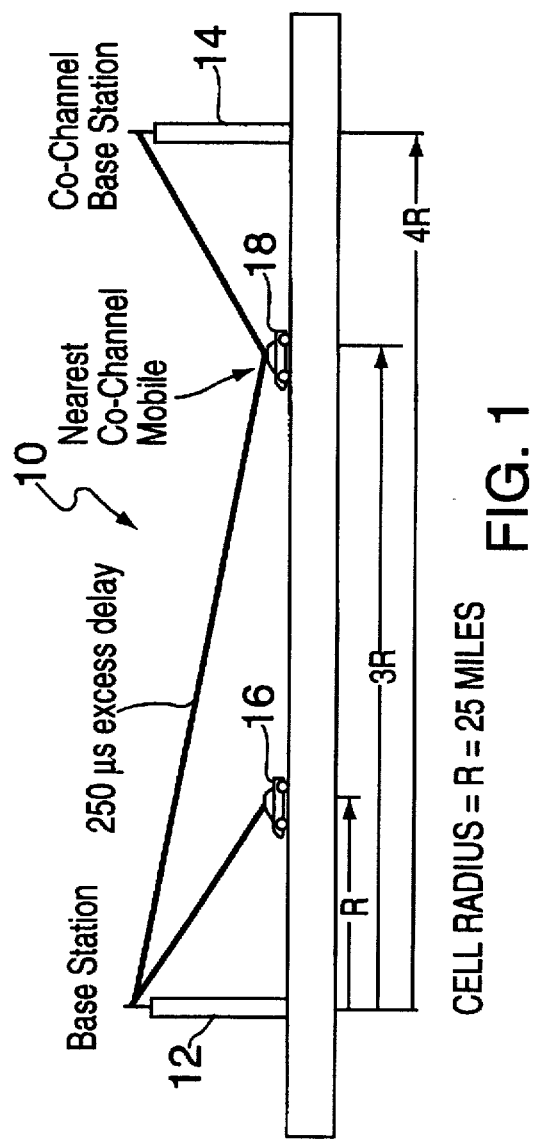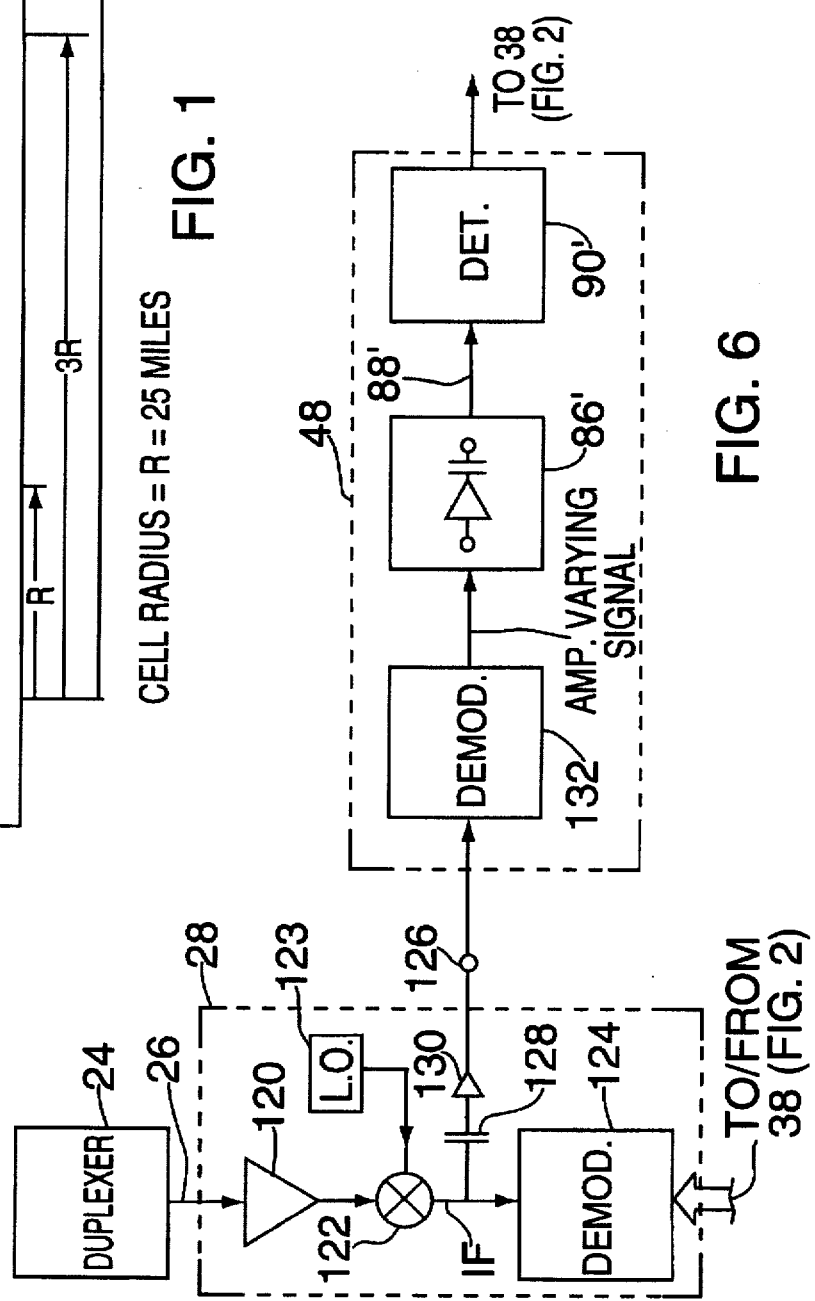

VALIDATION OF SUBSCRIBER SIGNALS IN A CELLULAR RADIO NETWORK

BACKGROUND OF THE INVENTION

1. Field of the Invention

The present invention relates to cellular radio networks, and particularly to a system and technique for identifying interfering co-channel signals received at network base stations, by determining propagation time delays associated with the received signals.

2. Description of the Known Art

Advances in cellular telephone technology with resulting economies in the manufacture and distribution of cellular telephone equipment, have allowed the active number of network subscribers to increase steadily. Cellular radio telephone networks now cover most all major population centers. In the United States, cellular radio networks were constructed initially to operate according to the so-called Advanced Mobile Phone System (AMPS). The AMPS uses an analog FM radio transmission signal format. A number of contiguous "cells" of given radius are drawn to overlie a desired area of network coverage. A base station is centrally located in each cell. Each base station transmits downlink signals to a remote network subscriber unit (SU) over one of 832 channels each of which is 30 kHz wide. The transmit spectrum allocated for AMPS base stations is 869 to 894 MHz. A subscriber unit located within a given base station's cell, transmits a 30 kHz wide uplink signal to the station over an assigned channel within an allocation of 824 to 849 MHz. Certain base and subscriber channels are dedicated for management and control operations, e.g., assigning a voice channel to a SU when called by another party or when the SU desires to place a call, setting the SU's transmit power, determining when the SU should be "handed over" to a neighboring cell's base station for better signal quality, and the like. As described, access to an AMPS cellular network requires a full-time assignment of a frequency channel to establish a link between a base station and a given SU. That is, AMPS uses a frequency division multiple access (FDMA) scheme in which each assigned base station and SU channel pair handle only one communications link at a time.

Digital voice signal processing technology is being applied to upgrade the performance and capacity of existing AMPS and other cellular radio networks. In the United States, a digital cellular system referred to herein as American Digital Cellular (ADC) has been adopted. ADC is compatible with existing AMPS platforms and channel spectrum allocations. Digital cellular systems achieve significant advantages over the analog FDMA systems, since the former permit each channel to be accessed for multiple links using a time division multiple access (TDMA) format. In the ADC system, transmissions from all the base stations occur within fixed frame periods of 20 ms. Each frame has three equal time slots of 6.6667 ms duration. Both control and voice or other traffic (e.g., facsimile) data is combined in each time slot for a given subscriber. Signals are transmitted from subscriber units to an assigned base station in a time slot assigned by the base station.

In addition to control and traffic data, the time slot data structure for the base station and subscriber signals includes a time synchronization (sync) signal or word having a 28-bit pattern. The sync word is intended to allow receivers at the base stations and SU's to establish bit synchronization, and to control signal processing functions such as adaptive equalization. Each of the three time slots in a frame is provided with a different sync word. Also included in the time slot data structure is a 12-bit coded digital verification color code (CDVCC). The code is intended for use in separating subscribers who may be using a common time slot but who are under the control of different base stations, i.e., interfering co-channel subscribers. Use of the CDVCC code at a base station requires first that the signal be decoded, and then compared with the correct code for those SU's assigned to the base station. The ability of a base station to handle an assigned subscriber's signal can be seriously impaired when a distant subscriber, transmitting on the same frequency channel and in the same time slot as a valid subscriber, presents an interfering signal at the base station. If the co-channel interfering signal dominates the valid signal, a valid but "weak" subscriber signal will be dropped from its base station link.

Discrimination between valid and invalid co-channel subscriber signals is necessary to allow, e.g., certain antenna beam steering equipment provided at some base stations effectively to lock onto or track a valid subscriber signal, and to ignore an invalid, interfering co-channel signal. It is desirable that such equipment be able to operate without the need to decode and compare existing validation signals, such as the mentioned CDVCC code words.

SUMMARY OF THE INVENTION

According to the invention, a method of tracking an uplink signal received at a base station of a radio communications network, comprises defining a downlink time slot during which a network base station transmits a downlink signal for reception by a network subscriber validly assigned to said base station, and defining an uplink time slot during which the subscriber transmits an uplink signal for reception at the base station. A reference signal is included in the uplink signal, at a certain time with respect to the uplink time slot, and the uplink signal is received using an antenna array having selectable patterns. A relative time offset of the reference signal with respect to the downlink time slot is measured when received in the uplink signal, and a determination is made whether or not the time offset is within a determined range. A received uplink signal is judged valid only if the time offset is within the determined range, and a pattern of the antenna array is selected according to the judgment result.

According to another aspect of the invention, a system for tracking an uplink signal received at a base station of a radio communications network, comprises transmitter means at a network base station for transmitting a downlink signal for reception by a network subscriber validly assigned to the base station, including means for defining a downlink time slot during which the downlink signal is transmitted. Means are provided for defining an uplink time slot during which the subscriber transmits an uplink signal for reception at the base station, with means for including in the uplink signal a reference signal at a certain time with respect to the uplink time slot. Antenna array means at the base station receives the uplink signal, and means are provided for selecting one of a number of different receiving antenna patterns. Means at the base station measures a relative time offset of the reference signal when received in the uplink signal with respect to the downlink time slot, and determines if the time offset is within a determined range. Means are also provided for judging a received uplink signal as valid only if the time offset is within the determined range, and for selecting a pattern of the antenna array according to the judgment result.

For a better understanding of the invention, together with other and further objects, reference is made to the following description taken in conjunction with the accompanying drawings, and the scope of the invention will be pointed out in the appended claims.

BRIEF DESCRIPTION OF THE DRAWINGS

In the drawings:

FIG. 1 illustrates a co-channel interference condition at a base station of a cellular radio network;

FIG. 6 is a schematic block diagram of an uplink reference signal detector in the base station of FIG. 2.;

DETAILED DESCRIPTION OF THE INVENTION

Figures 2, 3:
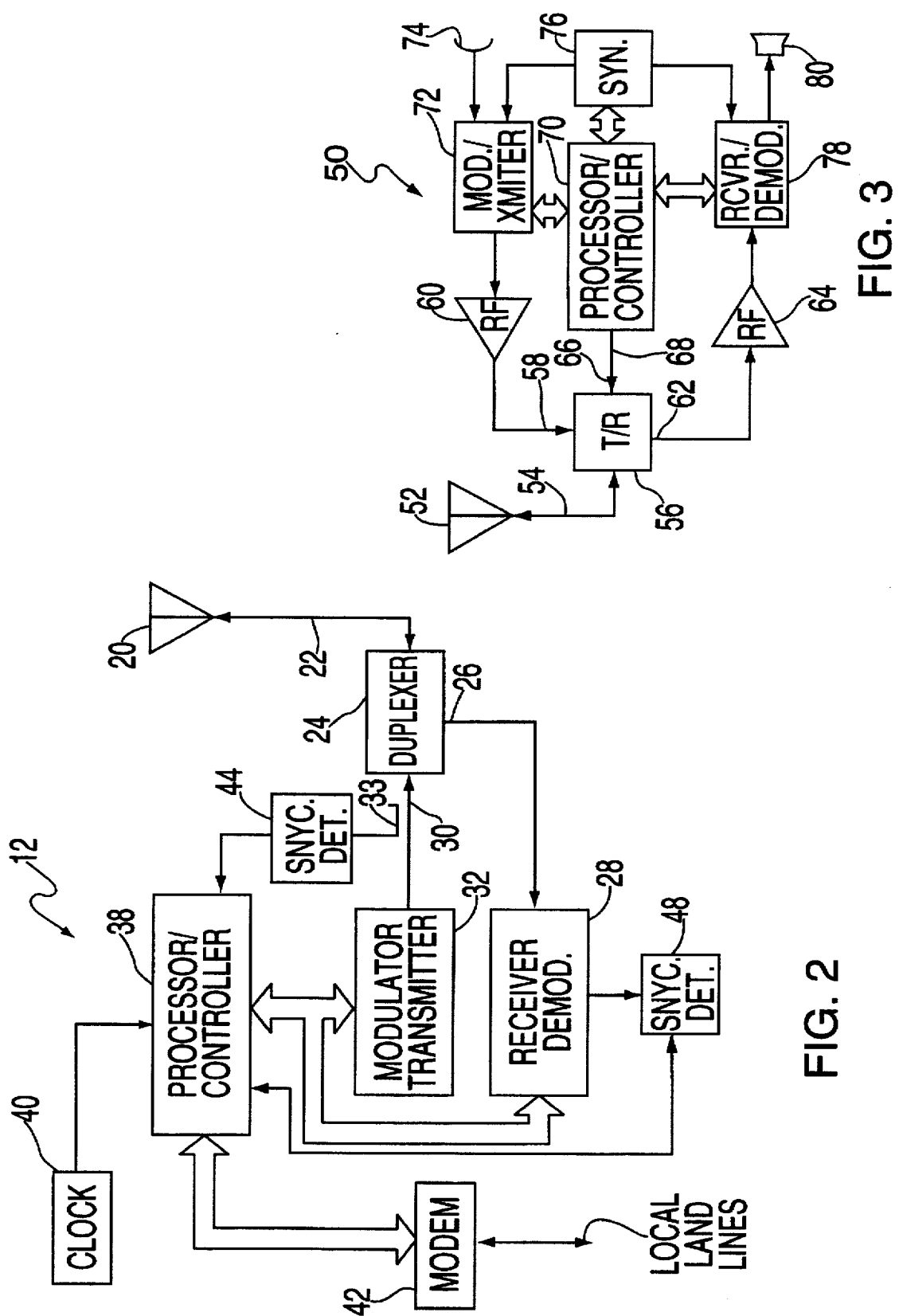
FIG. 2 is a schematic block diagram of a cellular base station according to the invention.
FIG. 3 is a schematic block diagram of a network subscriber unit.

The present invention enables co-channel subscriber interference at a cellular radio base station to be alleviated reliably and in a cost effective manner. The invention provides a technique and system for validating signals received at a cellular radio base station, and can be implemented with little if any modifications to existing base station equipment.

FIG. 1 represents a co-channel interference condition in cellular radio network 10. Cellular radio networks comprise a set of contiguous "cells" of defined size and shape, which collectively overlie a geographic region served by a given network. Base stations, such as stations 12 and 14 in FIG. 1, are erected centrally in each cell. For purposes of illustration and without limiting the scope of the invention, it is assumed that each cell of the network 10 has an average radius R of 25 miles. Because multiple base stations are dispersed over the full area of network coverage, significantly less transmitter power is needed to establish links between the base stations and subscriber units located within each station's cell area. In FIG. 1, mobile unit 16 is assigned to link with base station 12, and unit 18 is assigned to link with station 14.

Because an uplink signal from a mobile or other SU in one cell is usually strong enough to reach base stations in neighboring cells, different frequency channels are assigned for use by the base stations and mobile units in adjacent cells. Otherwise, signals transmitted from a SU and intended for reception at the unit's assigned base station in its home cell, will be received and decoded by neighboring base stations of adjacent cells as well. Links established between neighboring base stations and their local subscribers will be interfered with and severed. Accordingly, to avoid such co-channel interference, channel frequencies are re-used only at cells located a certain minimum distance (for example, 4R in FIG. 1) from a given cell. Such a cell spacing or "reuse distance" between co-channel operating cells does not, however, ensure that uplink signals from a SU can never cause interference with a link at a base station of a distant co-channel cell.

The present invention uses to advantage the fact that an uplink signal from a SU, for example, mobile unit 18 in FIG. 1, will reach a distant base station (e.g., station 12) with a time delay in excess of a maximum delay allowed an uplink signal from a SU (e.g., mobile unit 16) within the cell coverage of the base station 12. Assume that the signals from units 16 and 18 take about 5 µs. to travel one mile. The time for an uplink signal from unit 16 to reach base station 12 is thus about 125 µs. The time for a potential interfering co-channel uplink signal from unit 18 to reach base station 12 is about 375 µs. Thus, at base station 12, an undesired uplink signal from unit 18 encounters a 250 µs excess time delay travelling to the base station 12, relative to a valid uplink signal from mobile unit 16.

FIG. 2 is a diagram of the base station 12. A base station antenna 20 is coupled through a transmission line 22 to an antenna port of a duplexer 24. The duplexer 24 has a receiver port 26 coupled to a radio frequency (RF) input of a receiver/demodulator 28, and a transmitter port 30 is coupled to an output from a modulator/transmitter 32 through a directional coupler 33. Alternatively, separate transmit and receive antennas may be arranged at the station 12 in a known configuration.

A base station processor/controller 38 controls the functions and timing of operation of various base station circuits with a timing determined by a master base station clock 40. Processor 38 comprises, for example, a conventional microprocessor, one or more read-only-memories (ROMs) for storing an operating program relating to control of equipment at the base station, and one or more random access memories (RAMs) to allow processor 30 to handle and process control and traffic data transmitted from and received by the station. Processor 38 also operates to link the base station 12 with local land telephone and private data and control lines, through a modem 42.

In certain known digital cellular radio networks, the clock 40 operates in synchronism with master clocks at other base stations. Such synchronism may be achieved via means (not shown) which locks the clock 40 and the other base station clocks with a master time clock source, e.g., GPS signals received and processed at one of the base stations. Examples of fully time-synchronized cellular networks are the integrated Dispatch Enhanced Network (iDEN), and the Global System for Mobile Communications (GSM).

A reference signal or sync word detector 44 has an input terminal connected to a sample signal port of the coupler 33. An output of the detector 44 is coupled to an input of the processor 36. Another reference signal or sync word detector 48 is coupled to a sample signal output of the receiver/ demodulator 28. An output of the detector 48 is also applied to an input of the processor 36. Further details of the detectors 44, 48 are described in connection with FIGS. 4, 5 and 6.

FIG. 3 is a block diagram of a mobile or portable subscriber unit (SU) 50. The SU 50 has a whip or stub antenna 52 depending on the form of the unit (vehicular, hand-held, or other portable or fixed configuration). Antenna 52 is coupled through a transmission line 54 to an antenna port of a T/R switch 56. The switch 56 has a transmitter port 58 coupled to an output of a RF transmit amplifier 60. The switch 56 also has a receiver port 62 coupled to a RF input of a RF receive amplifier 64. A control terminal 66 of the switch 56 is coupled to a switch control output 68 of a processor/controller 70. The processor 70 controls the operation of various circuits in the SU 50, and has a clock (not shown) which is synchronized via control data signals received from a network base station.

An input of the transmit amplifier 60 is coupled to an output from a modulator/transmitter 72. Analog voice signals produced by a microphone element 74 are converted to digital voice data. The voice data is combined in the modulator 72 with RF signals from a synthesizer (SYN) 76 under the control of the processor 70. For example, in the ADC system, digital voice data is modulated for RF transmission using a differential quadrature phase shift keying (D-QPSK) format.

A base station signal received via antenna 52 and amplified at 64 is applied to an input of a receiver/demodulator 78. The receiver 78 is coupled to the processor 70 and SYN 76, and it decodes digital voice and control data that is modulated on the base station signal. The digital voice data is converted to analog form and is applied through a suitable voice amplifier (not shown) to a speaker or earpiece 80.

Figure 4:
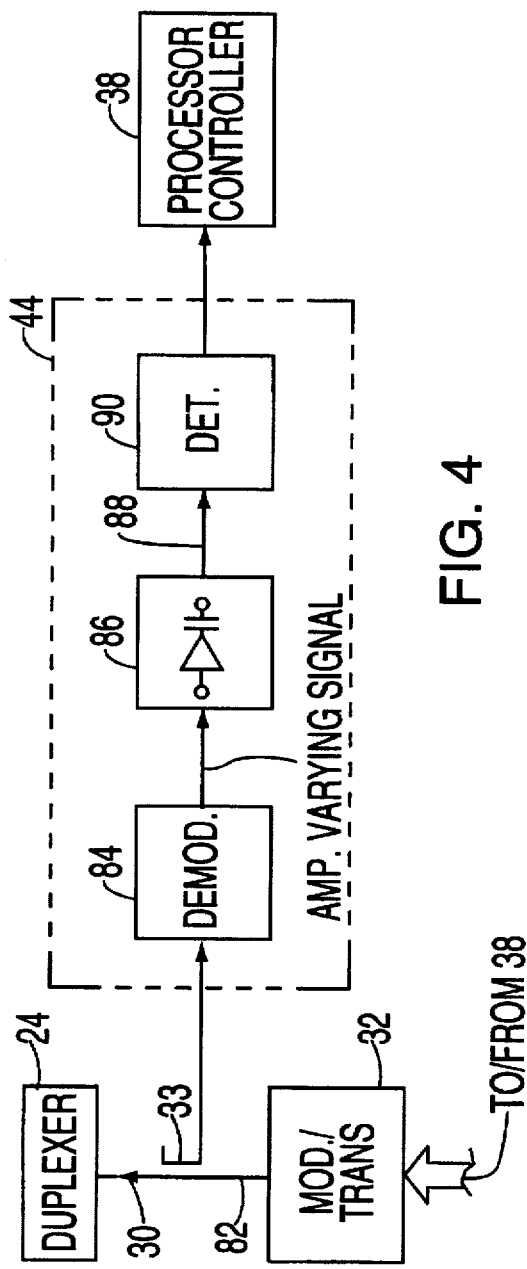
FIG. 4 is a schematic block diagram of a downlink reference signal detector in the base station of FIG. 2.

FIG. 4 is a diagram of the sync word detector 44 in FIG. 2. Base station modulator/transmitter 32 supplies a modulated RF carrier signal through a transmission line 82 to the transmitter port 30 of the duplexer 24. Digital voice and control data are encoded on the carrier signal, and the coupler 33 supplies a sample of the carrier signal to an input of a demodulator 84. The demodulator 84 is configured to produce an output signal that exhibits amplitude variations in response to modulated data on the RF carrier sample. For example, if data is QPSK modulated on the carrier, demodulator 84 may include a conventional double balanced mixer (DBM) phase detector to generate amplitude variations in response to carrier phase swings. Other kinds of phase detectors known in the art which produce an output signal having an amplitude that varies with changes in phase of the input signal, may be used in the demodulator 84. See U.S. patent application Ser. No. 08/444,138 filed May 18, 1995, and assigned to the assignee of the present invention. All relevant portions of the '138 application are incorporated by reference.

An output from the demodulator 84 is connected to an AC coupling circuit 86, for example, a buffer with an AC coupled output at 88. The circuit 86 removes any DC component from the amplitude varying signal at the demodulator output, and produces a corresponding bipolar signal at 88 which is applied to an input of a coincidence detector network 90. The network 90 is explained more fully in connection with FIG. 5, and operates to determine the presence of recurring reference signals or sync words encoded in the RF carrier in transmission line 82. For example, in the ADC system, the duration τ of the 28-bit sync words is 576.1 μs., and the sync words recur with a period T of 6.6667 ms. As mentioned, there are three sync words per 20 ms frame in the ADC system, one sync word for each time slot. The detector 90 supplies clock or timing signals to the processor 38, which timing signals are in phase with the recurring sync words encoded on the downlink RF carrier signal from base station transmitter 32.

Figure 5:
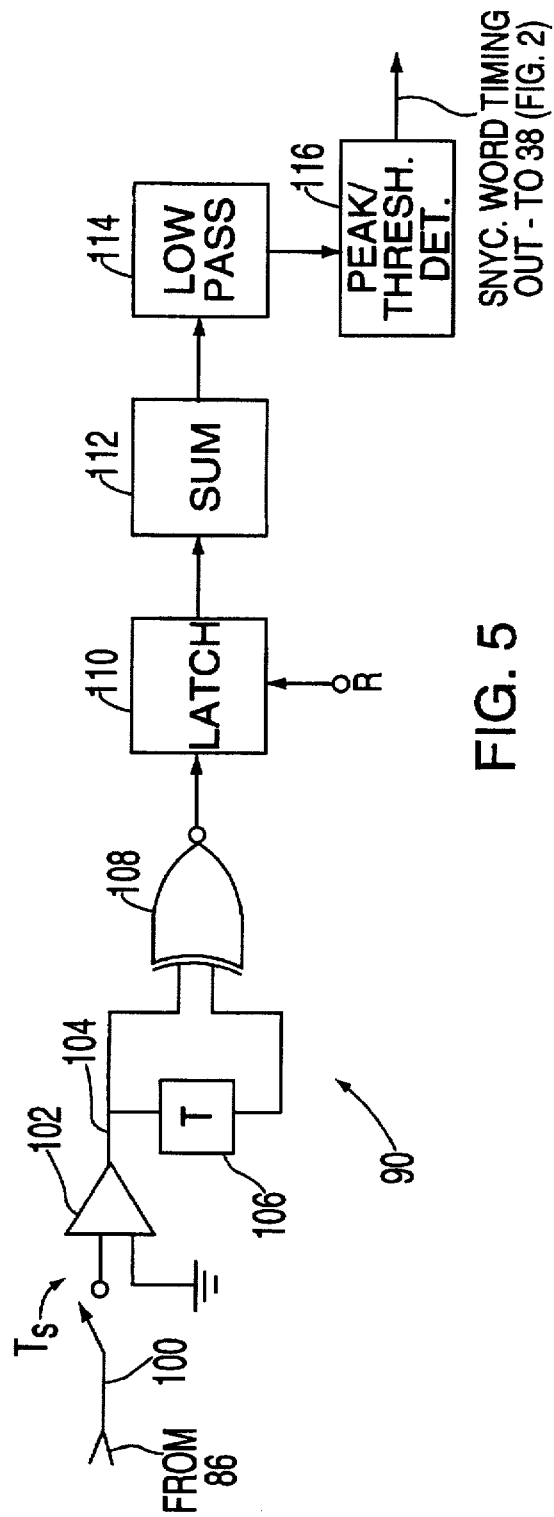
FIG. 5 is a schematic block diagram of a coincidence network arrangement in the detector of FIG. 4.

FIG. 5 is a diagram of the detector 90 in FIG. 4. A commutator 100 samples the amplitude varying signal supplied from AC coupling circuit 86, and it provides corresponding samples to one input of a comparator 102. A remaining input of comparator 102 is connected to DC ground for a zero-volt reference. The sampling interval Ts of commutator 100 is set to be less than the known recurring signal duration τ, e.g., less than 576.1 μs. for ADC systems. It is preferred that commutator 100 produce an integer number of samples during the recurring signal period T (e.g., more than 324 samples when T=6.6667 msec) and that the clock error for the commutator 100 not exceed 75 ppm (0.0005 msec when T=6.6667 msec).

Comparator 102 converts signal samples whose amplitudes may vary above and below a zero volt DC level, to one-bit unipolar digital logic signals. An output terminal 104 of the comparator is connected to an input terminal of a delay circuit 106 and to one input of a coincidence gate 108. Gate 108 may also be referred to as an exclusive NOR gate. The delay circuit 106 provides a signal time delay corresponding to the period T of recurring reference signals or sync words modulated on the RF carrier signal from base station transmitter 32. An output terminal of the delay circuit 106 is connected to a remaining input terminal of the gate 108. Gate 108 thus outputs a logic "1" only in response to coincident inputs, i.e., both inputs at logic "0", or both inputs at logic "1". A logic "1" and a logic "0" input combination causes the gate 108 to output a logic "0". The output from gate 108 is coupled to a set terminal of a latch 110 which supplies a coincidence signal whenever the gate 108 outputs a logic "1" at each signal sampling interval. Latch 110 is reset via a signal applied at terminal R, which signal is produced by circuitry associated with commutator 100 just after each signal sample is applied to comparator 102. The output of latch 110 is applied to a summing network 112 that adds each of the latch output signals in a time window equal to the duration τ of the reference signal. An output of the summing network 112 is applied through a low pass filter 114 to a peak/threshold detector 116 which continuously samples the filtered output from the summing network 112. Once the peak/threshold detector 116 detects an output greater than a fraction of a stored maximum detected output level, e.g., 75%, the detector 116 triggers a clock or timing pulse in phase with a corresponding reference signal encoded on the downlink signal from the base station transmitter 32 (FIG. 4).

Operation of the detector 44 assumes that, except for periodically recurring reference signals, it is equally probable a logic "1" or a logic "0" will be encoded at a given position in any two successive time slots. Because the reference signals are known to recur at a fixed period T in the sampled downlink signal, an identical amplitude varying signal will recur at the output of demodulator 84 with the period T. Between the demodulated reference signals, amplitude level variations at the demodulator output can not be predicted as a function of time because, as mentioned, control and traffic data encoded in the time slots is not predictable.

Downlink reference signal (sync word) timing pulses output from demodulator 84 are supplied to the base station processor 38 which uses them for determining the presence of an interfering co-channel uplink signal, as explained below.

FIG. 6 is a diagram of the detector 48 in FIG. 2, including a coupling arrangement within the base station receiver 28. In the receiver 28, an RF amplifier 120 has an input coupled to the receiver port of the duplexer 24, and an output of the amplifier 120 is coupled to an input of a mixer 122. A synthesizer or local oscillator (L.O.) 123 is coupled to another input of the mixer 122, and an output of the mixer 122 is coupled to an input of a receiver demodulator 124. The output of demodulator 124 is coupled with the base station processor 38.

Receiver 28 has an RF sample output terminal 126 for producing a sample of an uplink signal to which the receiver 28 is tuned. For example, an IF output of mixer 122 may be coupled to the terminal 126 through a capacitor 128 in series with a buffer 130. The IF output of mixer 122, which is also applied to the input of receiver demodulator 124, is thus substantially unaffected. The detector 48 in FIG. 6 has a demodulator 132 an input of which is coupled to the RF sample output terminal 126. Demodulator 132 is similar to the demodulator 84 of the detector 44 in FIG. 5, although the demodulator 132 may need to respond to a modulated RF signal at a different frequency, e.g., at the intermediate frequency (IF) of receiver 28. The detector 48 in FIG. 6 also has an AC coupling circuit 86' and a detector 90', both of which may be identical or similar to the corresponding circuits in FIG. 4. An output from the detector 90' of the sync word detector 48 is supplied to a corresponding input of the base station processor 38.

An important feature of the detectors 44, 48 of FIGS. 4–6, is that they produce periodic timing signals without knowledge of the actual bit sequence of the reference signals modulated on the uplink and the downlink signals, and without using more complex demodulating and decoding circuitry to identify the defined reference signals which are carried by the downlink and the uplink signals.

Figure 8:
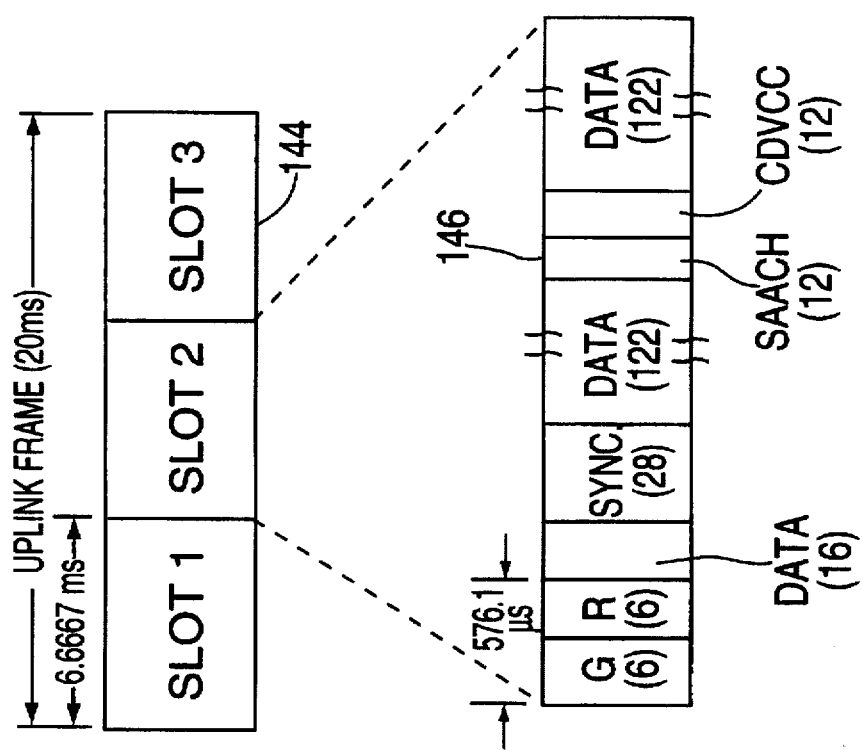
FIG. 8 is a timing diagram showing time slots in an uplink signal frame.
Figure 7:
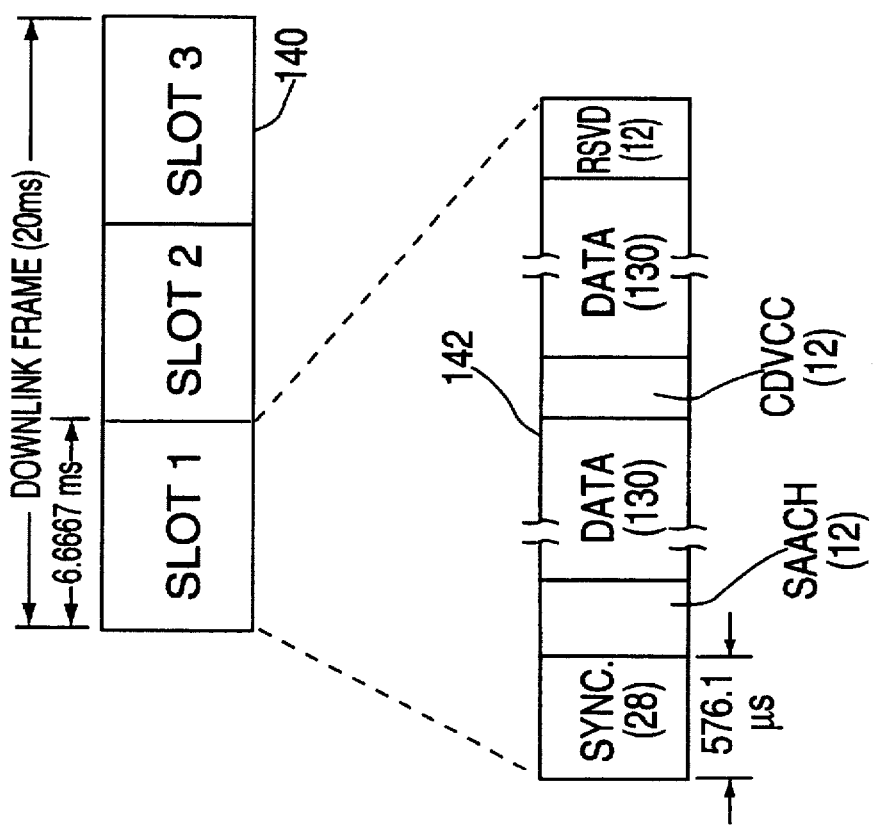
FIG. 7 is a timing diagram showing time slots in a downlink signal frame.

FIG. 7 is a timing diagram showing time slots in a base station (downlink) signal frame 140, including positions of a recurring sync word and other, non-recurring signals in one time slot 142. FIG. 8 is a timing diagram showing time slots in a subscriber unit (uplink) signal frame 144, including positions of a recurring sync word and other, non-recurring data signals in one time slot 146 of the frame 144. For purposes of illustration only, and without limitation of the scope of the invention, it is assumed that the network 10 is a TDMA digital cellular network specified according to the mentioned ADC system, and, in addition, that all base stations transmit downlink signal frames in time-synchronism with one another. As mentioned, systems in which such universal synchronization are mandated include the iDEN system and the GSM.

The base station downlink signal frame 140 is divided into three equal time slots (SLOT 1, SLOT 2, and SLOT 3), each of 6.6667 (or 20/3) ms duration. Each slot is partitioned in a determined order to include specific control, voice or traffic data destined to a selected subscriber unit. In the ADC system, the first 28 bits in each downlink (base station) signal time slot are defined as a unique time SYNC word of 576.1 µs duration. When a base station establishes a link with a subscriber unit, the station sends control and traffic data to the unit in the same time slot of each successive frame 140. In addition to a SYNC word, each time slot contains 12 bits of system control information (SACCH), the coded digital verification color code (CDVCC) of 12 bits, two 130-bit traffic data bits, and 12 reserved (RSVD) bits at the tail end of the time slot.

As shown in FIG. 8, once a remote subscriber unit is transmitting to a network base station after establishing a link with the station, the SU must transmit during a time slot (e.g., SLOT 2) other than the time slot (SLOT 1) during which the base station transmits to the SU. A subscriber unit's time slot 146 is partitioned to begin with a guard (G) time interval of 6 bits during which no energy is transmitted, followed by a 6-bit ramp (R) interval during which the SU is allowed to attain full transmit output power. There are three traffic data blocks in the SU time slot 146. The first data block contains 16 bits and the last two blocks carry 122 bits each. The data blocks are interleaved and contain error correction codes. The first DATA block is followed by a 28-bit SYNC word identical to the SYNC word used by the base station when transmitting to the unit during, e.g., SLOT 1. The second DATA block is followed by a 12 bit slow access control channel (SACCH) data block, a 12-bit CDVCC data block, and the third DATA block of 122-bits. As shown in FIG. 8, the SYNC word is positioned to start 576.1 µs from the beginning of the uplink signal time slot 146.

Figure 9:
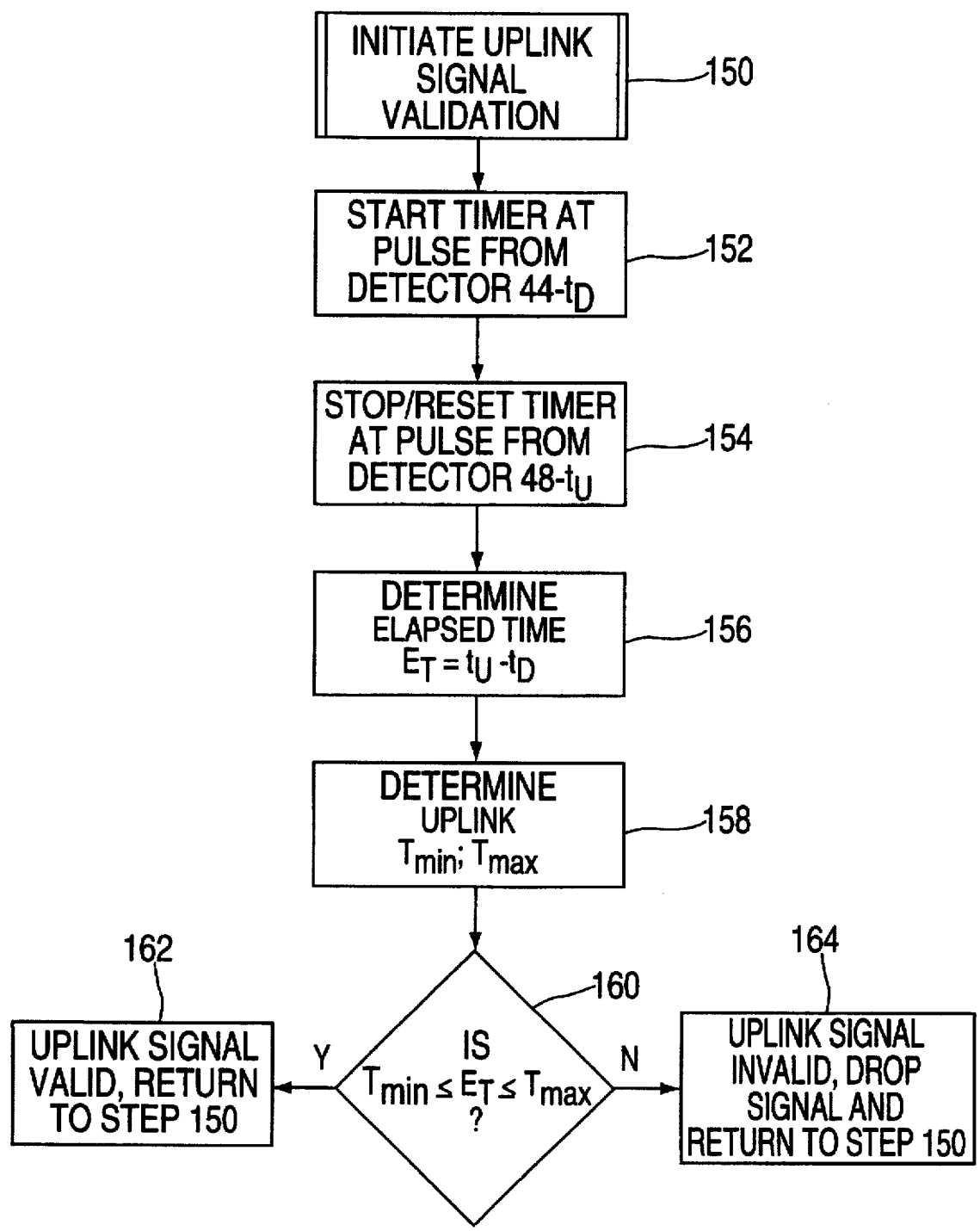
FIG. 9 is a flow chart of operations carried out at the base station of FIG. 2 to validate a received uplink signal.

FIG. 9 is a flow chart of operations carried out by a processor/controller associated with a measurements receiver 202 described in connection with FIG. 10. The measurements receiver 202 is part of equipment at the base station 12 which operates to select an optimum receiving antenna pattern for an incoming, valid uplink subscriber signal. Assume that base station 12 in FIG. 1 has established a communications link with a valid mobile unit 16 while the latter is just inside the base station's cell radius R (e.g., about 25 miles away from the station 12). An initial validation process is carried out by the base station processor 38, using the mentioned coded digital verification color code (CDVCC) words.

Assume also that the base station processor 38 operates to time-align the end of a valid uplink signal time slot, to lead the beginning of the station's downlink time slot by 1,852 ms. Such a time alignment represents a Rx/Tx time spacing of 45 symbol periods of 41.15 µs each, as prescribed by the ADC standard. Because another base station 14 in FIG. 1 is at least a certain reuse distance (4R) from base station 12, assume further that network 10 permits base station 14 to establish a separate link with another mobile unit 18 on the same frequency channel and during the same time slots used by station 12 to link with the mobile unit 16.

It is possible under certain conditions for an uplink signal from mobile unit 18 intended for reception at the base station 14, to arrive at the base station 12 with a strength comparable to or greater than the strength of the uplink signal from unit 16. For example, unit 16 may be located out of line of sight from the station 12 due to intervening natural or man-made structures. Mobile unit 18, at a distance 2R farther from base station 12 than unit 16, may nonetheless have a clear line of sight with the base station 12, e.g., from a high elevation. Other factors may also combine to strengthen an uplink signal from unit 18 at the base station 12. Co-channel uplink signal interference is then present at base station 12.

But the uplink signal from mobile unit 18 must travel a known minimum farther distance (2R) to reach base station 12, with respect to the maximum distance R an uplink signal must travel from units validly assigned to base station 12. Assuming both of the base stations 12, 14 have time-aligned their associated mobile units 16, 18 identically at the respective stations, a co-channel signal from the unit 18 will encounter a minimum excess delay time when propagating to the base station 12. According to the invention, this excess delay time is used to discriminate valid from invalid uplink co-channel signals reaching the antennas of the base station 12. Recurring sync words are detected in received uplink signals, and those uplink signals whose sync words are measured to be within a determined time offset range with respect to recurring sync words in the downlink signals from the base station, are handled as valid uplink subscriber signals. Uplink signals having sync words that are outside the determined offset range are judged invalid, and are not processed further when discriminated at the base station 12.

The validation/invalidation process of FIG. 9 proceeds as follows. An uplink signal validation routine 150 is initiated at determined intervals by the measurements receiver processor, in step 150. A timer responsive to an output from downlink sync word detector 44 is set to run once the output of the detector 44 exceeds a preset threshold level at time $t_D$ (step 152). The timer continues to run until an output above a preset threshold level is produced at time $t_u$ from the uplink sync word detector 48. The timer is then stopped and reset (step 154). A determination is made in step 156 of an elapsed lag time $ET=t_u-t_D$ between the outputs of the sync word detectors 44 and 48.

In general, the position of the sync word in a downlink signal time slot is not always identical to the position of the sync word in an uplink signal time slot, and depends on the operating system in use by the network 10. See, e.g., the ADC slot structure of FIGS. 7 and 8, and other digital cellular radio systems in which reserved access channels have different slot structures from those of random access channels in the same system. Thus, the measurements receiver processor looks up applicable maximum and minimum valid offset times $T_{max}$; $T_{min}$ for the particular time slot formats then in use at the station (step 158). Using the time slot structures of FIGS. 7 and 8, and assuming that the uplink time slot has been time-aligned with the downlink time slot as discussed above, the end of the uplink sync word leads the beginning of the downlink sync word by (6.6667−1.1522)+ 1.852≈7.366 ms. Assuming the uplink/downlink signal time frames are of 20 ms duration, a valid uplink sync word will therefore lag the downlink sync word, at the base station 12, by 20−7,366=12,634 ms. $T_{max}$ and $T_{min}$ will depend on the overall time alignment accuracy of the system. With an overall system accuracy of ±10 µs, a permissible time offset range of, e.g., three times system accuracy is adopted. The permissible range within which a valid uplink sync word may lag a downlink sync word at the base station 12 is thus set to be 12.634 ms±30 µs, so that $T_{max}$=12,664 ms, and $T_{min}$=12,604 ms.

The measurements receiver processor judges, in step 160, if the determined elapsed lag time ET is between $T_{max}$ and $T_{min}$. If the result is YES, the received uplink signal is deemed valid, the measurements receiver processor continues to select an optimum receive antenna pattern for the uplink signal (step 162). If the judgment result is NO, the uplink signal is deemed invalid, and the processor selects other receive antenna patterns seeking a valid co-channel uplink signal (step 164). Once an uplink signal is judged valid in step 162, or invalid in step 164, the routine returns to step 150.

For example, if the co-channel mobile unit 18 is time aligned with its assigned base station 14, sync words originating from the unit 18 during the same time slot in which mobile unit 16 transmits, will arrive at the base station 12 with a 0.250 ms minimum delay with respect to sync words from the valid unit 16. The "invalid" sync words will thus lag valid uplink sync words at the station 12 by at least 0.250 ms, bringing them outside the permissible offset range defined by $T_{max}$ and $T_{min}$, above. Accordingly, with the present technique, the validity or invalidity of co-channel uplink signals appearing at the base station 12 in overlapping time slots, can be determined on an ongoing basis.

As disclosed herein, the present invention is capable of implementation at a so-called multi-beam base station having a sector transmit-receive antenna, and an array of multiple narrow-beam receive antenna elements the patterns of which collectively define a sector of the base station's coverage. Part of a multi-beam base station 200 is shown in FIG. 10. See U.S. patent application Ser. No. 08/379,820 filed Jan. 27, 1995, and assigned to the assignee of the present invention. All relevant portions of the '820 application are incorporated by reference.

Base station 200 includes the measurements receiver-controller 202. The receiver 202 is coupled selectively to each of four receive antenna elements 204, 206, 208, 210 through a switch 218, to determine which element provides a best signal-to-noise ratio for a received uplink signal. A separate base receiver 212 fully demodulates and decodes control and traffic data from the uplink signal.

The measurements receiver 202 also has an input coupled to the base station downlink signal through a coupler 214 in a transmission line from a station base transmitter 216. The coupler 214 may serve as the downlink signal coupler 33 in FIG. 2 of the present application, and the present detectors 44, 48 can be incorporated in the measurements receiver 202. Three time frames will be required for validation in the base station 200. An uplink signal time slot in a first frame is used to select the optimum receive antenna element beam, i.e., antenna element 204, 206, 208 or 210. The selected antenna element is coupled to the measurements receiver 202 during the corresponding time slots in the next two frames and the signal is determined as being valid or invalid. Thus, station processing during the same time slot in three consecutive frames can provide a determination of the beam with the strongest amplitude, and a valid or invalid signal. If an uplink signal received on a selected antenna element is judged invalid and the station was previously tracking a valid signal, then a "coast mode" of operation can be initiated. In such a mode, the last receive antenna element over which a valid signal was received, is coupled to the base receiver 212 through switch 220 until the invalid signal is no longer dominant.

Figure 10:
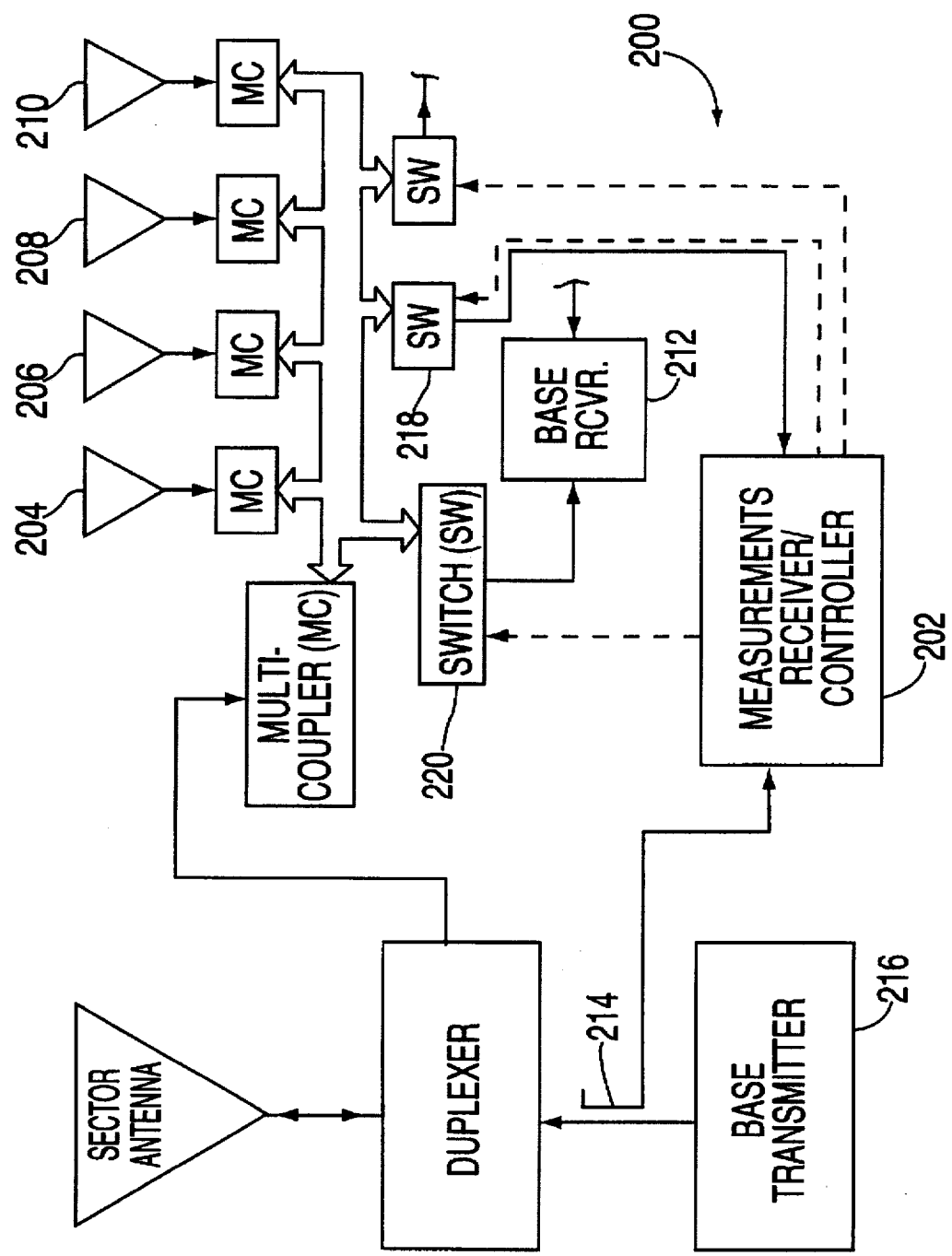
FIG. 10 is a schematic block diagram of part of a multi-beam base station in which the present validation technique can be applied.

In another possible mode of operation, antenna elements other than one on which a dominant signal is judged invalid, are selected by the processor of the measurements receiver 202 in FIG. 10 until a dominant co-channel signal is judged valid. The dominant, valid signal is then allowed to be processed further by the base station.

While the foregoing description represents preferred embodiments of the invention, it will be obvious to those skilled in the art that various changes and modifications may be made without departing from the true spirit and scope of the invention as pointed out in the following claims.

What is claimed is:

1. A method of validating an uplink signal received at a base station of a cellular radio communications network, comprising:

defining a downlink time slot during which a base station assigned to a subscriber transmits a downlink signal for reception by the subscriber;

including in said downlink signal a defined reference signal at a certain time relative to the downlink time slot;

defining an uplink time slot during which the subscriber transmits an uplink signal for reception at a base station;

including in said uplink signal a defined reference signal at a certain time relative to the uplink time slot;

measuring a time offset between transmission from the base station of a reference signal associated with a downlink time slot and reception of a reference signal associated with an uplink time slot;

determining if said time offset is within a determined range; and processing the uplink signal as valid only if said time offset is within said determined range.

2. The method of claim 1, wherein said measuring step includes coupling with a conductor that directs said downlink signals from transmitter means to antenna means at the base station, and obtaining a corresponding coupled downlink signal, demodulating the coupled downlink signal to obtain a corresponding amplitude varying signal, and detecting a time of occurrence of a reference signal in said amplitude varying signal.

3. The method of claim 1, wherein said measuring step includes coupling with receiver means that receives an uplink signal at the base station, and obtaining a corresponding coupled uplink signal, demodulating the coupled uplink signal to obtain a corresponding amplitude varying signal, and detecting a time of occurrence of a reference signal in said amplitude varying signal.

4. The method of claim 1, including determining the range of said time offset according to a maximum system time slot alignment error between the base station and a valid subscriber.

5. The method of claim 1, including tracking uplink signals by arranging at least two receive antenna elements at the base station, aligning each one of the antenna elements for a peak response to an uplink signal arriving from a direction different than a direction with which another one of the receive antenna elements is aligned, and coupling a most favorable antenna element to a base station receiver for processing of valid uplink signals.

6. The method of claim 1, including defining multiple downlink time slots during each of which a base station transmits a downlink signal for reception by different subscribers;

including in each downlink signal a reference signal at a certain time relative to the time slot associated with the downlink signal;

defining multiple uplink time slots during each of which a different subscriber transmits an uplink signal for reception at a base station;

including in each uplink signal a reference signal at a certain time relative to the time slot associated with the uplink signal;

measuring time offsets between transmission from the base station of each reference signal associated with a downlink time slot, and reception at the base station of each reference signal associated with an uplink time slot;

determining if each of said time offsets is within a determined range; and processing each uplink signal as valid only if a time offset associated with the uplink signal is within said determined range.

7. A system for validating an uplink signal received at a base station of a cellular radio communications network, comprising:

first transmitter means at a given base station for transmitting a downlink signal from the base station for reception by a network subscriber;

means associated with said first transmitter means for defining a downlink time slot during which the downlink signal is transmitted, and means for including in said downlink signal a reference signal at a certain time relative to the downlink time slot;

second transmitter means associated with a network subscriber, for transmitting an uplink signal for reception at a network base station;

means associated with the second transmitter means for defining an uplink time slot during which an uplink signal is transmitted, and means for including a reference signal in said uplink signal at a certain time relative to the uplink time slot;

means at said given base station for measuring a time offset between transmission of the reference signal associated with a downlink time slot, and reception of a reference signal associated with an uplink time slot;

means for determining if said time offset is within a determined range; and means for processing the uplink signal as valid only if said time offset is within said determined range.

8. The system of claim 7, including means for coupling with a conductor that directs said downlink signal from transmitter means to antenna means at the base station, and for obtaining a corresponding coupled downlink signal, means for demodulating the coupled downlink signal and for obtaining a corresponding amplitude varying signal, and means for detecting a time of occurrence of a reference signal in said amplitude varying signal.

9. The system of claim 7, including means for coupling with receiver means that receives an uplink signal at the base station, and for obtaining a corresponding coupled uplink signal, means for demodulating the coupled uplink signal and for obtaining a corresponding amplitude varying signal, and means for detecting a time of occurrence of a reference signal in said amplitude varying signal.

10. A method of tracking an uplink signal received at a base station of a radio communications network, comprising:

defining a downlink time slot during which a network base station transmits a downlink signal for reception by a network subscriber validly assigned to said base station;

defining an uplink time slot during which said subscriber transmits an uplink signal for reception at the base station;

including in said uplink signal a reference signal at a certain time with respect to said uplink time slot;

receiving said uplink signal using an antenna array having selectable patterns;

measuring a relative time offset of the reference signal when received in said uplink signal with respect to said downlink time slot;

determining if said time offset is within a determined range and judging a received uplink signal as valid only if the time offset is within said range; and selecting a pattern of said antenna array according to a judgment result in said determining step.

11. The method of claim 10, wherein said measuring step includes, coupling with receiver means that receives an uplink signal at the base station, and obtaining a corresponding coupled uplink signal, demodulating the coupled uplink signal to obtain a corresponding amplitude varying signal, and detecting a time of occurrence of a reference signal in said amplitude varying signal.

12. The method of claim 10, including determining the range of said time offset according to a maximum system time slot alignment error between the base station and a valid subscriber.

13. The method of claim 10, including arranging at least two receive antenna elements at the base station, aligning each one of the antenna elements for a peak response to an uplink signal arriving from a direction different than a direction with which another one of the receive antenna elements is aligned, and coupling a most favorable antenna element to a base station receiver for processing of valid uplink signals.

14. The method of claim 10, including defining multiple downlink time slots at a network base station, during each of which downlink time slots the base station transmits a downlink signal for reception by a different network subscriber;

defining multiple uplink time slots at the base station, during each of which uplink time slots a different subscriber transmits an uplink signal for reception at the base station;

including in each uplink signal a reference signal at a certain time with respect to the time slot associated with the uplink signal; and measuring, at the base station, a relative time offset of each reference signal when received in an uplink signal with respect to an associated downlink time slot.

15. A system for tracking an uplink signal received at a base station of a radio communications network, comprising:

transmitter means at a network base station for transmitting a downlink signal for reception by a network subscriber validly assigned to the base station, including means for defining a downlink time slot during which the downlink signal is transmitted;

means for defining an uplink time slot during which said subscriber transmits an uplink signal for reception at the base station;

means for including in said uplink signal a reference signal at a certain time with respect to said uplink time slot;

antenna array means at said base station for receiving said uplink signal, including means for selecting one of a number of different receiving antenna patterns;

means at said base station for measuring a relative time offset of the reference signal when received in said uplink signal with respect to said downlink time slot;

means for determining if said time offset is within a determined range, and for judging a received uplink signal as valid only if the time offset is within said range; and means for selecting a pattern of said antenna array according to a judgment result in said determining step.

16. A system according to claim 15, including means at said base station for coupling with receiver means that receives an uplink signal, and for obtaining a corresponding coupled uplink signal, means for demodulating the coupled uplink signal and for obtaining a corresponding amplitude varying signal, and means for detecting a time of occurrence of a reference signal in said amplitude varying signal.

17. A system according to claim 15, including means at said base station for defining multiple downlink time slots during each of which the base station transmits a downlink signal for reception by a different network subscriber;

means at said base station for defining multiple uplink time slots during each of which a different subscriber transmits an uplink signal for reception at the base station;

means for including in each uplink signal a reference signal at a certain time with respect to the time slot associated with the uplink signal; and means at said base station for measuring a relative time offset of each reference signal when received in an uplink signal with respect to an associated downlink time slot.

* * * * *